United States Patent [19]

Ferrell et al.

[11] 4,212,748

[45] Jul. 15, 1980

[54] POLYMER FLOOD FILTRATION IMPROVEMENT

[75] Inventors: Howard H. Ferrell; Dell Conley; Burton M. Casad; Olaf M. Stokke, all of Ponca City, Okla.

[73] Assignee: Conoco, Inc., Ponca City, Okla.

[21] Appl. No.: 910,158

[22] Filed: May 26, 1978

Related U.S. Application Data

[63] Continuation-in-part of Ser. No. 777,203, Mar. 14, 1977, abandoned.

[51] Int. Cl.$^2$ .............................................. E21B 43/22
[52] U.S. Cl. ............................... 252/8.55 D; 166/246; 536/114; 435/104
[58] Field of Search ..................... 252/8.55 D, 8.55 R; 536/114; 195/31 P; 166/246

[56] References Cited

U.S. PATENT DOCUMENTS

| | | | |
|---|---|---|---|
| 3,305,016 | 2/1967 | Lindblom et al. | 166/246 |
| 3,436,346 | 4/1969 | Westover et al. | 252/8.55 |
| 3,729,460 | 4/1973 | Patton | 252/8.55 X |
| 3,801,502 | 4/1974 | Hitzman | 252/8.55 |
| 3,827,497 | 8/1974 | Dycus et al. | 166/274 |
| 3,853,771 | 12/1974 | Felmann et al. | 252/8.55 |
| 3,966,618 | 6/1976 | Colegrove | 252/8.55 |

*Primary Examiner*—Herbert B. Guynn
*Attorney, Agent, or Firm*—A. Joe Reinert

[57] ABSTRACT

Filterability of aqueous solutions of polymers employed to thicken waterfloods such as biopolymers (e.g. heteropolysaccharides) is improved by addition of a surfactant (e.g. a sulfated alkoxylated alcohol). Filterability is further enhanced by addition of an ethoxylated alcohol surfactant and/or an alcohol.

6 Claims, No Drawings

POLYMER FLOOD FILTRATION IMPROVEMENT

RELATED U.S. APPLICATION DATA

This application is a continuation-in-part of application Ser. No. 777,203 filed Mar. 14, 1977, entitled, "Polymer Flood Filtration Improvement", abandoned upon the filing of this application.

BACKGROUND OF THE INVENTION

1. Field of the Invention

The invention relates to recovery of hydrocarbons from a subterranean formation wherein an aqueous fluid is thickened and injected into an injection well and hydrocarbons are produced from a production well.

In a more specific aspect, the invention relates to an improvement in filterability of such organic polymers by addition of a surfactant to an aqueous mixture of the organic polymer prior to filtration.

2. Brief Description of the Prior Art

Enhanced recovery of hydrocarbons from subterranean formations by injection of water into an injection well and recovery of the hydrocarbons from a production well is well known. Also well known is addition of certain organic polymers to at least a portion of the aqueous fluid which is injected to thicken the waterflood and to further enhance recovery of hydrocarbons. Such thickened aqueous floods are commonly known as polymer floods.

Also well known is combination of such polymer flooding techniques with surfactant flooding and the like to further enhance recovery of hydrocarbons.

One problem with injection of such aqueous floods containing organic polymers is plugging of the formation injected into. This problem can be particularly troublesome with biopolymers of which the Xanthan gums or heteropolysaccharides produced by fermentation with *Xanthomonas campestris* are a very commercially important example.

To mitigate the problem of plugging of the formation injected into, aqueous solutions of such organic polymers are commonly filtered prior to injection.

However, the filters employed to remove the plugging components also rapidly lose capacity and often become plugged.

The improvement of the instant invention results in considerable enhancement of such filtration.

OBJECTS OF THE INVENTION

An object of the invention is to provide an improved process for filtration of aqueous mixtures of organic polymers employed in enhanced recovery of oil from subterranean formations.

SUMMARY OF THE INVENTION

A process of recovery of hydrocarbons from a subterranean formation (wherein an aqueous liquid is injected into an injection well and hydrocarbons are produced from a production well, wherein at least a portion of the aqueous liquid is thickened with an organic polymer, and wherein an aqueous mixture containing the organic polymer is filtered prior to injection of the polymer) is improved by adding an amount of a surfactant to the aqueous mixture containing the polymer prior to filtration and sufficient to improve filterability. Filterability is further enhanced by addition of an ethoxylated alcohol surfactant and/or an alcohol.

PREFERRED EMBODIMENTS OF THE INVENTION

The improvement in filterability of aqueous mixtures of organic polymers of this invention is useful in any process for the recovery of hydrocarbons from a subterranean hydrocarbon containing formation wherein an aqueous fluid is injected into an injection well and hydrocarbons are produced from a production well, wherein at least a portion of the aqueous fluid is thickened with the polymer, and wherein the aqueous mixture containing the polymer is filtered prior to injection of the polymer. Examples of such processes include the so-called polymer floods, micellar floods wherein a polymer thickened slug is employed, and surfactant floods wherein a polymer thickened slug is employed.

Commercially important examples of organic polymers, the filterability of aqueous mixtures of which are improved according to the process of the invention, include; partially hydrated polyacrylamides and biopolymers such as heteropolysaccharides or xanthan gums produced by fermentation with *Xanthomonas campestris* bacteria. A commercial example of the polyacrylamides are Dow's Pusher polymers. Commercially available examples of the heteropolysaccharide polymers are the Kelzan xanthan polymers or the Xanflood products available from Xanco Oil Field Products, 3501 West Alabama, Houston, Texas; which is related to Kelco Co; which is related to Merck and Co., Inc.

According to a presently preferred mode, the invention is particularly applicable to improving filterability of aqueous mixtures of the heteropolysaccharides produced by fermentation with *Xanthomonas campestris*, NRRL B-1459.

According to a presently preferred mode of operation, a sulfated alkoxylated alcohol surfactant is employed and preferably is a sulfated ethoxylated alcohol. Examples of commercially available surfactants of this type include Alfonic 1412A product available from Continental Oil Company, Neodol 25-35 product available from Shell Chemical Company, and Tergitol 15-5-3.0 product available from Union Carbide.

According to another presently preferred mode of operation, a hydrocarbon sulfonate surfactant is employed, and is preferably a sodium hydrocarbon sulfonate surfactant, a potassium hydrocarbon sulfonate surfactant, an ammonium hydrocarbon sulfonate surfactant, or a substituted ammonium hydrocarbon sulfonate surfactant.

Examples and disclosure of suitable hydrocarbon sulfonate surfactants are provided in U.S. Pat. Nos. 3,874,454 and 4,058,467, which are herein incorporated by reference for purpose of disclosing some suitable hydrocarbon sulfonate surfactants.

Thus, the sulfonates employed in the practice of the invention can be water-soluble sulfonates, oil-soluble sulfonates, and mixtures thereof, and can be petroleum derived sulfonates or synthetically derived sulfonates or mixtures.

Petroleum derived sulfonates are prepared by sulfonating a suitable refinery stream which contains hydrocarbon precursors of suitable molecular weight to produce the desired sulfonates or blends thereof. The synthetically derived sulfonates can be prepared by numerous means, such as sulfonating alkyl aryl fractions synthesized in various chemical operations, such as the alkylation of benzene to obtain alkylates of suitable molecular weight.

Examples of suitable refinery streams and synthetically produced chemical compounds which can be sulfonated and used in the practice of the present invention are as follows:

pale oil extract;

heavy coker gas oil;

cracked refinery distillate streams;

crude oil having an API gravity of at least 25 and an aromatic hydrocarbon content of at least 15 weight percent;

linear alkenes containing from about 8 to about 32 carbon atoms;

branched-chain alkenes containing from about 8 to about 32 carbon atoms;

an alkylation reaction product and/or by-products from reaction of an aromatic hydrocarbon and a partially chlorinated normal $C_{10}$–$C_{18}$ alkane reaction product having 2 to 15 weight percent chlorine content;

an alkylation reaction product and/or by-products from reaction of an aromatic hydrocarbon with a partially chlorinated normal $C_{10}$–$C_{18}$ alkane reaction product having 15 to 45 weight percent chlorine content;

an alkylation reaction product and/or by-products from reaction of an aromatic hydrocarbon and a straight chain alkene containing from about 10 to about 35 carbon atoms;

an alkylation reaction product and/or by-products from reaction of an aromatic hydrocarbon and a branched-chain alkene having 10 to 35 carbon atoms;

an alkylation reaction product and/or by-products from reaction of an aromatic hydrocarbon and a chlorinated reaction product of a straight chain alkylaromatic hydrocarbon having the formula R'—Ar—(R")$_n$ wherein R' is a straight alkyl radical having 10 to 18 carbon atoms, Ar is a benzene or naphthalene ring having a valence of n+1, R" is a methyl or ethyl radical, and n is 0, 1, or 2, said chlorination reaction product having a chlorine content of 10 to 60 weight percent;

hydrocarbons having an average molecular weight of at least 400;

hydrocarbons having an average molecular weight of at least 400 in combination with hydrocarbons having an average molecular weight of 200 to 400 (the higher molecular weight hydrocarbons form oil-soluble sulfonates whereas the lower molecular weight hydrocarbons form water-soluble sulfonates);

an alkylation reaction product and/or by-products of an aromatic hydrocarbon and a partially chlorinated $C_{10}$–$C_{18}$ alkane reaction product having 2 to 15 percent chlorine content in combination with an alkylation reaction product of an aromatic hydrocarbon and a branched-chain alkene having 10 to 35 carbon atoms; and, hydrocarbons and refinery streams in any combination with those set forth hereinabove.

The sulfonation reaction employed to produce the sulfonic acid precursors of the sulfonates employed in the present invention is essentially the same whether petroleum sulfonates or synthetic sulfonates are to be prepared. Any suitable well-known sulfonation procedure can be employed. Thus, the sulfonating agent can be oleum, $SO_3$, mixtures of $SO_3$ and $SO_2$, chlorosulfonic acid, or the like. Furthermore, the sulfonation can be carried out by either a batch-type process or a continuous process such as a falling film sulfonation process.

The sulfonic acid precursors formed by the above mentioned sulfonation procedures are then neutralized to produce the desired sulfonate and/or sulfonate mixture. When desired, the neutralized sulfonate can be overbased. The neutralization and/or overbasing procedure can likewise be carried out by any one of several methods known in the art. Alkali metal hydroxides and ammonium hydroxide are suitable base components often employed in the neutralizing and/or overbasing procedures. The most desirable results are usually obtained when the base component is NaOH.

The sulfonate constituent which can be employed in the present invention can be a mixture of water-soluble sulfonates and oil-soluble sulfonates. The term "water-soluble sulfonate" as used herein refers to alkali metal or ammonium hydrocarbon sulfonates having an average equivalent weight of about 200 to about 400, whereas the term "oil-soluble sulfonates" refers to those alkali metal or ammonium hydrocarbon sulfonates having an average equivalent weight of about 400 or more. The average equivalent weight of such oil-soluble sulfonates will range from about 400 to about 600 when the sodium hydrocarbon sulfonates are employed. The water-soluble sulfonates and the oil-soluble sulfonates can be petroleum derived sulfonates or synthetically derived sulfonates. Average equivalent weight relates to the weight of one equivalent of sulfonate moieties. One can readily determine the average equivalent weight of a sulfonate by employing ASTM Method D2548-69 to isolate the 100 percent sulfonate; then determining the equivalent weight by any convenient means such as percent sulphur, titration, percent ash, or the like.

The sulfonates employed in the practice of the invention when the sulfonate mode is employed can be either mixtures of oil-soluble sulfonates and water-soluble sulfonates, as hereintofore described, or individual sulfonate constituents. However, the average equivalent weight of the sulfonates used in the practice of the invention will range from about 300 to about 600. Desirable results are obtained when the sulfonate constituent has an average equivalent weight of from 350 to about 500. Especially desirable results are often obtained when the average molecular weight of the sulfonate employed is from about 400 to about 450.

Examples of some ethoxylated alcohols which are suitable include polyoxyethylene lauryl, cetyl, stearyl, and oleyl ethers; ethoxylated alkyl phenols, e.g., octyl and nonylphenoxypoly (ethylenoxy) ethanol, and the like.

Examples of suitable alcohols which can be employed include water soluble alcohols such as methanol, ethanol, isopropanol, methyl Carbitol, hexyl Carbitol, and the like.

Filtration can be by any conventional method such as by a diatomaceous earth filter, a revolving drum filter, sand filters, paper filters, combinations thereof, or the like. Filtration is enhanced such that back washing or other cleaning, regeneration, or reconstitution of the filters is surprisingly greatly reduced.

When the surfactants of the invention are employed to enhance filtration, any amount that results in decreased capacity of the filter system or increased time between reconditioning of the filter system can be employed. When sulfated ethoxylated alcohol surfactants are employed, amounts of such surfactants above about 0.01 gram of surfactant per gram of polymer are suitable. Amounts in the range of about 0.04 to 0.12 have exhibited good effect, and amounts in the range of about 0.02 to 0.20 are presently believed to be a practical working range. Higher amounts can be employed if economically justified. Lower amounts can also be employed until the effectiveness decreases to the point that use is not economically justified.

The surfactant can be added to the polymer solution at any time and in any manner prior to filtration to effect the improvement of our invention. Thus, it can be added in the hydration brine employed to make a polymer concentrate, it can be added to the dilution brine used to dilute the concentrate, or it can be added to both. Our present experience indicates that it is best added after hydration and shearing of the polymer when a biopolymer is employed.

The following examples are provided in order to more fully explain the invention and provide information to those skilled in the art on how to carry it out. However, it is to be understood that these examples are not intended to function as limitations on the invention as described and claimed herein.

EXAMPLES

In a pilot demonstration of enhanced recovery of oil involving surfactant flooding, an aqueous slug of biopolymer produced by Xanthomonas campestris was injected into the hydrocarbon bearing formation for mobility control. It was necessary to filter the aqueous mixture of the biopolymer to prevent plugging of the formation. Such filtering of the aqueous mixture of biopolymer was extremely difficult. The diatomaceous earth filter which was employed plugged rapidly, and the filtrate failed to pass a Millipore criterion for injection. A surprising and serendipitous discovery was made that addition of 10% by weight of isopropyl alcohol containing 100 parts per million (based on alcohol) of surfactant from a residual left in the tank used for alcohol storage (the tank having previously been used for storage of surfactant) greatly improved filterability and decreased filter plugging.

A series of runs were made in the laboratory in the following manner. Polymer concentrates of 5,000 ppm were made with synthetic softened reservoir brine by dumping Kelzan biopolymer (a commercially available xanthan heteropolysaccharide biopolymer) into the brine vortex produced in a Waring blender set on high speed with a Variac setting at about 30%, after which the Variac was increased to 50% and the concentrate was mixed for 7 minutes. In a series of runs biocides and surfactants were blended into the brine before the polymer addition. The concentrates thus prepared were sheared by passing through a spray nozzle three times at a $\Delta P$ (pressure drop) of 500 psig per pass. Solutions of 500 ppm polymer were made by diluting the concentrates with synthetic softened reservoir supply brine enriched to a salinity of 1.8% with sodium chloride and hardened with 33 parts per million calcium chloride.

The dilute samples were blended at moderate agitation for 5 minutes with the Variac set at about 28 to 30%. Surfactants and biocides (if used) were added to the dilution brine in each run ahead of the polymer concentrate.

In a series of runs demonstrating diatomaceous earth filterability, a technique was employed whereby samples could be filtered with positive pressure using a regular Millipore filter holder equipped with an oversized O-ring to allow for a diatomaceous earth filter cake buildup. A piece of Whatman number 4 filter paper was cut to size and placed in the filter holder to support the diatomaceous earth precoat.

The feed reservoir was a Lucite plastic cylinder sealed at the top with a threaded brass cap and an O-ring. Air pressure was supplied through a fitting in the cap to which polyethylene tubing with an inline valve was connected. The Millipore filter holder was connected to the bottom outlet of the reservoir via Swagelok fittings, stainless steel tubing, and a block valve. Polyethylene tubing was employed to carry the effluent from the filter holder to disposal or a 500-ml graduate.

To make a run, it was necessary first to liquid fill the filter holder and displace the air. The filter holder was rotated with the Swagelok fitting to an upflow position. About 200–300 mls of the brine were placed in the feed reservoir with the exit block valve closed. Brine was allowed to gravity flow into the filter holder by slowly opening the exit block valve. At this point, the filter holder contained only the Whatman filter paper. Within a minute or two, the brine would displace the air, wet the Whatman paper, and be visible in the out flow tubing. The block valve was closed, the Swagelok fitting was loosened, and the filter holder was rotated 180° to the down flow position.

Dicalite Speedflow diatomaceous earth, similar to Johns-Mansville's Standard Super-Cel diatomaceous earth employed in the field operation, was used for both the precoat and the body feed in the runs. A precoat of about 0.07 lb/ft$_2$ was laid down on the Whatman paper by displacing a slurry containing 0.49 grams of diatomaceous earth from the reservoir. This was done by slowly opening the reservoir outlet valve (inlet to the filter holder), opening the inlet to the reservoir at the top, and slowly lowering by hand the air line with air flowing down toward the open reservoir inlet. Enough pressure would build up in the reservoir without actually making a connection to displace the precoat slurry. Once the slurry level reached the bottom of the cone at the bottom of the reservoir, flow was stopped. Otherwise, air could be trapped when the reservoir was recharged. If necessary, additional brine was added to flush away diatomaceous earth which may have precipitated out on the wall of the outlet cone.

Body feed was added batchwise to a sample before it was placed in the feed reservoir. Generally, if the sample had foam on top, as much as possible was skimmed off first. Once loaded, a pressure of 10 psig was applied, and the reservoir outlet valve was opened slowly. Once the flow was established, the discharge from the filter holder was collected in a 500-ml graduate as a timer was started. The cumulative elapsed time for each 50 mls of filtrate accumulated in the graduate was recorded. If necessary, the procedure was repeated to collect enough filtrate (about 550 mls) for a Millipore filter test.

In the Millipore filter test the effectiveness of conditioning the polymer solutions by diatomaceous earth filtration was determined by testing the filtrates with 0.8 micron Millipore filters according to the following procedure. The Millipore filter holder was equipped with the normal O-ring, and the Millipore filter replaced the Whatman filter paper. The filter holder was mounted in an upflow position, the polymer solution itself was used to displace the air and wet the Millipore filter. This step was accomplished by gravity flow. If care was not taken to displace the air, the filtration area would have been reduced by the area of contact of air trapped on the Millipore filter. That portion of the filter would not have carried flow. Once the air was displaced, 10 psig were applied to the feed reservoir, and the timer was started as flow entered the 500-ml graduate cylinder. Again, the cumulative time was recorded for each 50 mls of incremental flow through the Millipore filter.

To be suitable for injection into the reservoir contemplated the last 50 mls of 500 mls of polymer solution to flow through the filters should take no more than twice as long as the first 50 mls.

From a series of runs, the best results were obtained with a combination of about 15 parts per million ALFONIC ® 1412-A alcohol ether sulfate (a sulfated ethoxylated alkanol derived from an alkanol mixture having about 40% C-12 and 60% C-14 linear alcohol which is commercially available from Continental Oil Company, Houston, Texas 77001 which contained 0.22 parts of ethanol per part of alcohol ether sulfate) via the dilution brine with about 6 parts per million ALFONIC ® 1412-40 ethoxylated alcohol (an ethoxylated alcohol surfactant produced by ethoxylating a linear alkanol mixture containing about 60% C-14 and 40% C-12 to about 40% ethylene oxide content, which is commercially available from Continental Oil Company, Houston, Texas 77001) added either in the dilution brine or in the hydration brine (60 ppm), after conditioning by diatomaceous earth filtration. The rates of the Millipore flow times for the last 50 mls to the first 50 mls were less than 1.5 for these runs. Results only marginally poorer were obtained with a liquid dishwashing detergent formulation widely available as a consumer item (30% active of which about 80% is a sulfated ethoxylated alkanol surfactant and containing some ethanol) used in place of the ALFONIC ® 1412-A sulfated ethoxylated alkanol surfactant in the dilution brine or with the ALFONIC ® 1412-A sulfated ethoxylated alkanol surfactant used by itself added in the hydration brine (150 ppm). Without the surfactant additives, flow times of control runs for the last 50 mls relative to the first 50 mls doubled to about 2.8. Higher levels of surfactant are expected to be required with poor quality field waters.

Other runs demonstrate that 100 ppm of a hydrocarbon sulfonate surfactant alone in combination with isopropyl alcohol effect substantial improvements in filterability. Field data demonstrate that a commercial hydrocarbon sulfonate detergent formulation is quite effective.

Other runs demonstrated that as hardness equivalent to 30 ppm as calcium carbonate was added to the dilution brine to approximate field conditions, the addition of anionic surfactants such as ALFONIC ® 1412-A alcohol ether sulfate and a monoalkyl aromatic sulfonate to the hydration brine was not as effective as the ALFONIC ® 1412-40 ethoxylated alcohol nonionic surfactant in improving flow through the diatomaceous earth precoat. A concentration of about 60 ppm of ALFONIC ® 1412-40 sulfated ethoxylated alkanol in the hydration brine was indicated to be the best mode by a series of tests. The ALFONIC ® 1412-60 ethoxylated alcohol product was not as effective in the series of runs as the ALFONIC ® 1412-40 ethoxylated alcohol surfactant.

At low surfactant concentrations, alcohol and/or ether sulfate may be desirable to completely solubilize all the components in the surfactant. An oil soluble portion of a surfactant or the unreacted free oil associated with a surfactant product may not stay in a small micelle. Thus, when employing a surfactant which is largely a hydrocarbon sulfonate, use of an alcohol and/or an ether sulfate is often required. Optimization of materials to enhance filterability as described and claimed herein can readily be determined for a particular system by those skilled in the art by a series of routine experiments not amounting to invention. Excellent results are obtained with biopolymer solutions derived from biopolymer concentrates which have been sheared.

Later field operating results, with a full scale diatomaceous earth filter on a pilot enhanced recovery project are in accordance with the above results. The best field results obtained show excellent filtrate quality with hardly any difference between the times of the first 50 cc and the 450–500 cc on the Millipore monitoring, and are obtained by addition of about 100 ppm of the ALFONIC ® 1412-A sulfated ethoxylated alkanol and about one part of ethyl alcohol per 4.5 parts of the sulfated ethoxylated alkanol surfactant to the basic polymer solution.

We claim:

1. In a process for recovery of hydrocarbons from a subterranean formation wherein an aqueous fluid is injected into an injection well and hydrocarbons are produced from a production well; wherein at least a portion of the aqueous fluid is thickened with a heteropolysaccharide biopolymer produced by fermentation with Xanthomonas campestris; and wherein the aqueous mixture containing the biopolymer is filtered prior to injection of the biopolymer; the improvement comprising:

adding an amount of a hydrocarbon sulfonate surfactant or a sulfated alkoxylated alcohol surfactant sufficient to improve filterability of the aqueous mixture containing the biopolymer prior to filtration.

2. The process of claim 1 wherein 0.04 to 0.12 grams of the sulfated ethoxylated alkanol surfactant are employed for each gram of heteropolysaccharide in the mixture filtered, and wherein the biopolymer is a heteropolysaccharide biopolymer produced by Xanthomonas campestris NRRL B-1459.

3. The process of claim 1 wherein filterability is further enhanced by addition of a water soluble alcohol to the polymer prior to filtration.

4. The process of claim 1 wherein an ethoxylated alcohol surfactant is added to the biopolymer prior to filtration to further enhance filterability.

5. The process of claim 1 wherein both an ethoxylated alcohol surfactant and an alcohol are added to the biopolymer solution prior to filtration to further enhance filterability.

6. The process of claim 1 wherein the surfactant is a water soluble sodium hydrocarbon sulfonate surfactant.

* * * * *